United States Patent
Huang et al.

(10) Patent No.: US 10,056,590 B2
(45) Date of Patent: Aug. 21, 2018

(54) METHODS OF MAKING SEPARATORS FOR LITHIUM ION BATTERIES

(71) Applicant: GM Global Technology Operations LLC, Detroit, MI (US)

(72) Inventors: Xiaosong Huang, Novi, MI (US); Nicole D. Ellison, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 15/253,052

(22) Filed: Aug. 31, 2016

(65) Prior Publication Data

US 2018/0062136 A1    Mar. 1, 2018

(51) Int. Cl.

| | |
|---|---|
| *H01M 2/14* | (2006.01) |
| *H01M 2/16* | (2006.01) |
| *B29C 41/02* | (2006.01) |
| *B29C 41/08* | (2006.01) |
| *B29C 41/28* | (2006.01) |
| *B29K 23/00* | (2006.01) |
| *B29L 31/34* | (2006.01) |
| *B29L 31/00* | (2006.01) |
| *B29K 105/00* | (2006.01) |

(52) U.S. Cl.
CPC ............ *H01M 2/145* (2013.01); *B29C 41/02* (2013.01); *B29C 41/08* (2013.01); *B29C 41/28* (2013.01); *H01M 2/162* (2013.01); *H01M 2/1653* (2013.01); *H01M 2/1666* (2013.01); *H01M 2/1686* (2013.01); *B29K 2023/00* (2013.01); *B29K 2105/0073* (2013.01); *B29K 2995/0077* (2013.01); *B29L 2031/3468* (2013.01); *B29L 2031/755* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 3,916,823 | A | 11/1975 | Halloran |
| 4,068,387 | A | 1/1978 | Manos |
| 6,261,722 | B1 | 7/2001 | Dasgupta et al. |

(Continued)

FOREIGN PATENT DOCUMENTS

| | | |
|---|---|---|
| CN | 1638850 A | 7/2005 |
| CN | 102820445 A | 12/2012 |

(Continued)

OTHER PUBLICATIONS

Wypych, "Knovel Solvents—A Properties Database", 2008; 2012; p. 1.

(Continued)

*Primary Examiner* — Erma C Cameron
(74) *Attorney, Agent, or Firm* — Harness, Dickey & Pierce, P.L.C.

(57) ABSTRACT

Methods for producing a battery separator are provided. The methods include applying a liquid precursor material to a substrate to generate a coating layer on the substrate. The liquid precursor material includes a polymer, and a first solvent. The methods also include precipitating the polymer from the liquid precursor material in the coating layer to form a polymer membrane, and drying the polymer membrane to generate a battery separator.

18 Claims, 4 Drawing Sheets

(56) References Cited

U.S. PATENT DOCUMENTS

| | | |
|---|---|---|
| 6,432,586 B1 | 8/2002 | Zhang |
| 6,444,356 B1 | 9/2002 | Ma et al. |
| 6,511,774 B1 | 1/2003 | Tsukuda et al. |
| 6,830,846 B2 | 12/2004 | Kramlich et al. |
| 7,018,607 B2 | 3/2006 | Nazri et al. |
| 7,592,195 B2 | 9/2009 | Rogalla et al. |
| 7,595,130 B2 | 9/2009 | Kawabata et al. |
| 7,691,529 B2 | 4/2010 | Hennige et al. |
| 7,722,994 B2 | 5/2010 | Halalay |
| 7,794,511 B2 | 9/2010 | Wensley et al. |
| 7,879,395 B2 | 2/2011 | Klipp et al. |
| 8,337,974 B2 | 12/2012 | Hennige et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,592,042 B2 | 11/2013 | Blohowiak et al. |
| 8,592,088 B2 | 11/2013 | Kim |
| 8,765,301 B2 | 7/2014 | Halalay et al. |
| 8,835,058 B2 | 9/2014 | Kia et al. |
| 8,951,654 B2 | 2/2015 | Sachdev et al. |
| 8,993,646 B2 | 3/2015 | Huang |
| 9,028,565 B2 | 5/2015 | Huang |
| 9,088,120 B2 | 7/2015 | Lev et al. |
| 9,138,932 B2 | 9/2015 | Huang |
| 9,172,075 B2 | 10/2015 | Kia et al. |
| 9,287,540 B2 | 3/2016 | Huang |
| 9,324,984 B2 | 4/2016 | Huang et al. |
| 9,333,588 B2 | 5/2016 | Carlson et al. |
| 9,346,066 B2 | 5/2016 | Huang |
| 9,406,971 B2 | 8/2016 | Kia et al. |
| 2002/0122986 A1 | 9/2002 | Labarge et al. |
| 2003/0099878 A1 | 5/2003 | Kramlich et al. |
| 2003/0148024 A1 | 8/2003 | Kodas et al. |
| 2004/0081886 A1 | 4/2004 | Zuckerbrod et al. |
| 2005/0070193 A1 | 3/2005 | Hennige et al. |
| 2005/0155411 A1 | 7/2005 | Rogalla et al. |
| 2007/0134548 A1* | 6/2007 | Wensley ............... H01M 2/145 429/144 |
| 2008/0090101 A1 | 4/2008 | Klipp et al. |
| 2008/0111027 A1 | 5/2008 | Blohowiak et al. |
| 2008/0220327 A1 | 9/2008 | Kim |
| 2008/0241699 A1 | 10/2008 | Halalay |
| 2009/0311418 A1 | 12/2009 | Hennige et al. |
| 2011/0129731 A1 | 6/2011 | Wakizaka et al. |
| 2011/0135987 A1 | 6/2011 | Shin |
| 2011/0236762 A1 | 9/2011 | Huang et al. |
| 2012/0102725 A1 | 5/2012 | Fuller et al. |
| 2012/0156568 A1 | 6/2012 | Kia et al. |
| 2012/0156569 A1 | 6/2012 | Kia et al. |
| 2012/0193331 A1 | 8/2012 | Carlson et al. |
| 2012/0231321 A1 | 9/2012 | Huang et al. |
| 2012/0315384 A1 | 12/2012 | Abd Elhamid et al. |
| 2013/0004857 A1 | 1/2013 | Kia et al. |
| 2013/0005196 A1 | 1/2013 | Lev et al. |
| 2013/0052509 A1 | 2/2013 | Halalay et al. |
| 2013/0143076 A1 | 6/2013 | Sachdev et al. |
| 2013/0236766 A1 | 9/2013 | Seo et al. |
| 2014/0038024 A1* | 2/2014 | Huang; Xiaosong . H01M 2/162 429/144 |
| 2014/0242452 A1 | 8/2014 | Pieczonka et al. |
| 2014/0272526 A1* | 9/2014 | Huang ................. H01M 2/145 429/144 |

FOREIGN PATENT DOCUMENTS

| | | |
|---|---|---|
| DE | 102012209381 A1 | 12/2012 |
| WO | WO-1995/016060 A1 | 6/1995 |
| WO | WO-2012/060604 A2 | 5/2012 |

OTHER PUBLICATIONS

Second Office Action issued by the Patent Office of the People's Republic of China dated Jan. 12, 2015 for Chinese Patent Application No. 201210185917.4, summary/translation provided by China Patent Agent (H.K.) Ltd.

Summary of Interview with Chinese Examiner of the Patent Office of the People's Republic of China dated Mar. 16, 2015 for Chinese Patent Application No. 201210185917.4, summary/translation provided by China Patent Agent (H.K.) Ltd.

Pankaj Arora and Zhengming (John) Zhang, Battery Separators, Chem. Rev. 2004, 104, 4419-4462.

First Office Action for Chinese Patent Application No. 201210185917.4 dated Mar. 5, 2014, 10 pages.

Xiaosong Huang et al.; U.S. Appl. No. 15/847,358, filed Dec. 19, 2017 entitled "Methods of Making Thermally-Stable Composite Separators for Lithium Batteries"; 45 pages.

\* cited by examiner

METHODS OF MAKING SEPARATORS FOR LITHIUM ION BATTERIES

FIELD

The present disclosure relates to methods for producing high quality, thermally stable porous battery separators by a phase inversion process.

BACKGROUND

This section provides background information related to the present disclosure which is not necessarily prior art.

High-energy density, electrochemical cells, such as lithium ion batteries and lithium sulfur batteries can be used in a variety of consumer products and vehicles, such as Hybrid Electric Vehicles (HEVs) and Electric Vehicles (EVs). Typical lithium ion and lithium sulfur batteries comprise a first electrode (e.g., a cathode), a second electrode (e.g., an anode), an electrolyte material, and a separator. Often a stack of battery cells are electrically connected to increase overall output. Conventional lithium ion and lithium sulfur batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Battery separators can be made by wet or dry processes to have an adequate porosity. The pores hold the electrolyte material, which enables ions to move between the first electrode and the second electrode. The process used to create pores in conventional lithium ion battery separators requires precise stretching of an extruded thin film. However, when these separators are exposed to heat, they endure shrinkage that increases the risk of battery shorting. It would be desirable to develop methods of producing porous battery separators that possess good thermal stability at a high production rate.

SUMMARY

This section provides a general summary of the disclosure, and is not a comprehensive disclosure of its full scope or all of its features.

The current technology provides a method for producing a battery separator. The method includes applying a liquid precursor material to a substrate to generate a coating layer on the substrate. The liquid precursor material includes a polymer and a first solvent. The method also includes precipitating the polymer from the liquid precursor material in the coating layer to form a polymer membrane, and drying the polymer membrane to generate the battery separator.

The current technology provides another method for producing a battery separator. The method includes applying a liquid precursor material to a solid film substrate to generate a coating layer on the solid film substrate. The liquid precursor material includes a polymer having a cohesive energy of greater than or equal to about 100,000 J/mol, a melting temperature of greater than or equal to about 300° C., a glass transition of greater than or equal to about 200° C., and a molecular weight of greater than or equal to about 10,000. The liquid precursor material also includes a first solvent and a second solvent having a higher volatility than the first solvent. The method also includes evaporating a portion of the second solvent, precipitating the polymer from the liquid precursor material in the coating layer to form a polymer membrane, rinsing the polymer membrane to remove the first solvent and any residual second solvent, and removing the solid film substrate from the polymer membrane, wherein the polymer membrane is the battery separator.

Additionally, the current technology provides a method for producing a battery separator that includes applying a liquid precursor material to at least one side of a substrate to generate at least one coating layer on the substrate, wherein the substrate is a woven fiber mat, a non-woven fiber mat, a polyolefin separator, or a polyolefin porous membrane. The liquid precursor material includes a polymer having a cohesive energy of greater than about 100,000 J/mol, a melting temperature of greater than about 300° C., a glass transition of about 200° C., and a molecular weight of greater than about 10,000 g/mol, a first solvent, and a second solvent having a higher volatility than the first solvent. The method also includes evaporating a portion of the second solvent, precipitating the polymer from the liquid precursor material in the coating layer to form a polymer laminate layer, and rinsing the polymer laminate layer to remove the first solvent and any residual second solvent and to thereby form the battery separator, which includes the substrate and at last one polymer laminate layer.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment. As used herein, the term "and/or" includes any and all combinations of one or more of the associated listed items.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
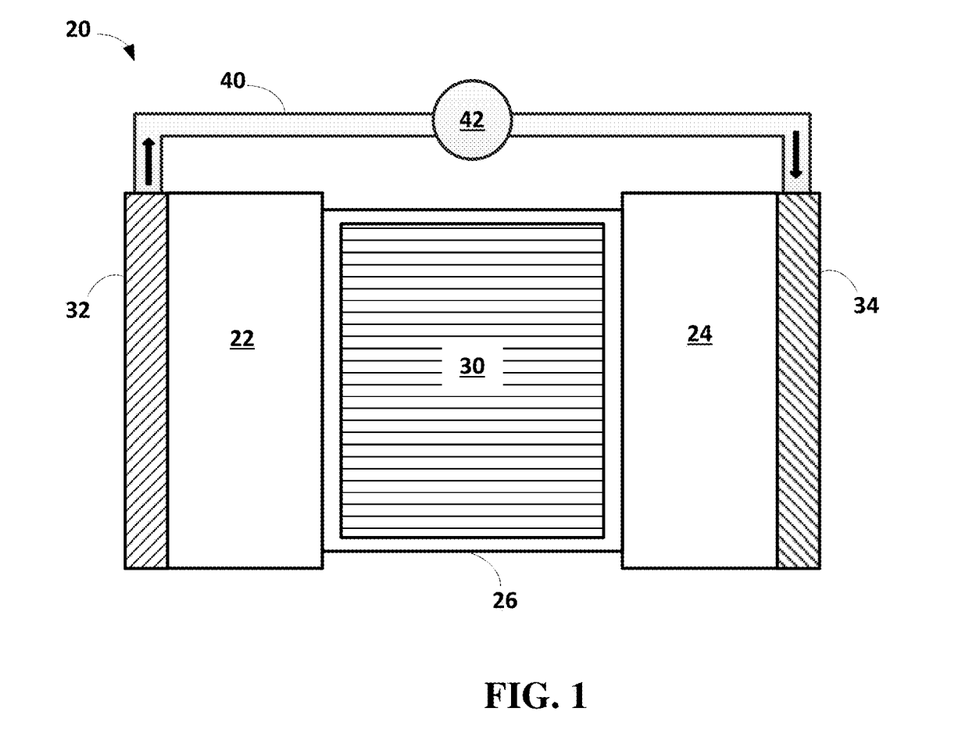
FIG. 1 is a schematic of an exemplary electrochemical battery cell.

The present technology pertains to improved electrochemical cells, including batteries, especially lithium ion batteries and lithium sulfur batteries that may be used in vehicle applications. An exemplary and schematic illustration of a battery 20 is shown in FIG. 1. The battery may be a lithium ion electrochemical cell or a lithium sulfur electrochemical cell. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connect the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the battery 20.

The battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24.

Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-powered at any time by connecting an external power source to the lithium ion battery 20 to reverse the electrochemical reactions that occur during battery discharge. The connection of an external power source to the battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the battery 20 may vary depending on the size, construction, and particular end-use of the battery 20. Some notable and exemplary external power sources include, but are not limited to, an AC wall outlet and a motor vehicle alternator. In many lithium ion battery and lithium sulfur battery configurations, each of the negative current collector 32, negative electrode 22, the separator 26, positive electrode 24, and positive current collector 34 are prepared as relatively thin layers (for example, several micrometers or a millimeter or less in thickness) and assembled in layers connected in electrical parallel arrangement to provide a suitable energy package.

Furthermore, the battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

In a lithium ion battery, the positive electrode 24 may be formed from a lithium-based active material that can sufficiently undergo lithium intercalation and deintercalation while functioning as the positive terminal of the lithium ion battery 20. The positive electrode 24 may include a polymeric binder material to structurally fortify the lithium-based active material. One exemplary common class of known materials that can be used to form the positive electrode 24 is layered lithium transitional metal oxides. For example, in certain embodiments, the positive electrode 24 may comprise at least one spinel comprising a transition metal like lithium manganese oxide ($Li_{(1+x)}Mn_{(2-x)}O_4$), where $0 \leq x \leq 1$, where x is typically less than 0.15, including $LiMn_2O_4$, lithium manganese nickel oxide ($LiMn_{(2-x)}Ni_xO_4$), where $0 \leq x \leq 1$ (e.g., $LiMn_{1.5}Ni_{0.5}O_4$), lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $y<1$, and M may be Al, Mn, or the like, other known lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In a lithium sulfur battery, the positive electrode includes sulfur-based compounds for a positive active material. A sulfur-based compound may be selected from at least one of: elemental sulfur, $Li_2S_n$ (wherein n is greater than or equal to 1), $Li_2S_n$ (wherein n is greater than or equal to 1) dissolved in a catholyte, an organosulfur compound, and a carbon-sulfur polymer ($(C_2S_x)_n$: wherein x=2.5, and n is 2 or greater). The positive electrode may also include electrically conductive materials that facilitate the movement of the electrons within the positive electrode. For example, graphite, carbon-based materials, or a conductive polymer. Carbon-based materials may include by way of non-limiting example ketchen black, denka black, acetylene black, carbon black, and the like. Examples of a conductive polymer include polyaniline, polythiophene, polyacetylene, polypyrrole, and the like. The conductive material may be used singularly or as a mixture of two or more materials. The positive electrode may also include a polymeric binder as described above.

The negative electrode 22 includes an electroactive material as a lithium host material capable of functioning as a negative terminal of a lithium ion battery. The negative electrode 22 may also include another electrically conductive material, as well as one or more polymeric binder materials to structurally hold the lithium host material together. For example, in certain embodiments, the negative electrode 22 may comprise graphite, lithium titanate oxide $Li_4Ti_5O_{12}$ (LTO), silicon, silicon-containing alloys, tin-containing alloys, and combinations thereof.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Any of these negative electroactive materials may of course be combined with other electroactive materials.

The separator 26 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP. As discussed further below, such separators may be used as a substrate in the current methods.

When the separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such a microporous polymer separator 26.

The present technology provides methods for forming high quality, thermally stable battery separators by a modified phase inversion process. Relative to conventional separator fabrication methods, the current methods generate porous separators with good thermal stability, improved mechanical properties, improved ionic conductance, solvent-resistance characteristics, and at an increased production rate. A polymer system employed in the current methods provides an improved separator mechanical performance. In the fabrication process, an optional volatile second solvent is used to improve processability for the increased production rate, and annealing may be used to increase membrane crystallinity for enhanced separator electrolyte resistance.

The conventional processes used to create pores in commercially available polyethylene or polypropylene lithium ion battery separators require precise stretching of an extruded thin film. However, heat exposure to these stretched separators initiates shrinkage that increases the risk of battery shorting. The current methods generate separators that have reduced shrinkage at elevated temperatures relative to conventional separators or no shrinkage. Separators formed in accordance with the present methods improve battery abuse tolerance through the use of thermally stable materials, and improve battery cycling performance as a result of enhanced separator/electrolyte wettability.

According to the present technology, a method of producing a battery separator comprises applying a liquid precursor material to a substrate to generate a coating layer on the substrate. The liquid precursor material comprises a polymer and a first solvent. In certain aspects of the current technology, the precursor material is a polymer solution. As used herein, the "liquid precursor material" includes the first solvent and the polymer, wherein the first solvent solvates a large portion of the polymer. In some embodiments, not all of the polymer is necessarily solvated by the first solvent. Therefore, the solvent may be understood to be a "polymer carrier." Moreover, as described further below, the liquid precursor material may include nano-sized particles and/or micro-sized particles, which may or may not be dissolvable in the first solvent, so that the liquid precursor material may be a suspension. As explained further below, the precursor material can be applied to at least one side of the substrate to generate at least one coating layer on the substrate. The application of the precursor material to a substrate can be performed, for example, by die coating or spray coating.

Figure 2A:
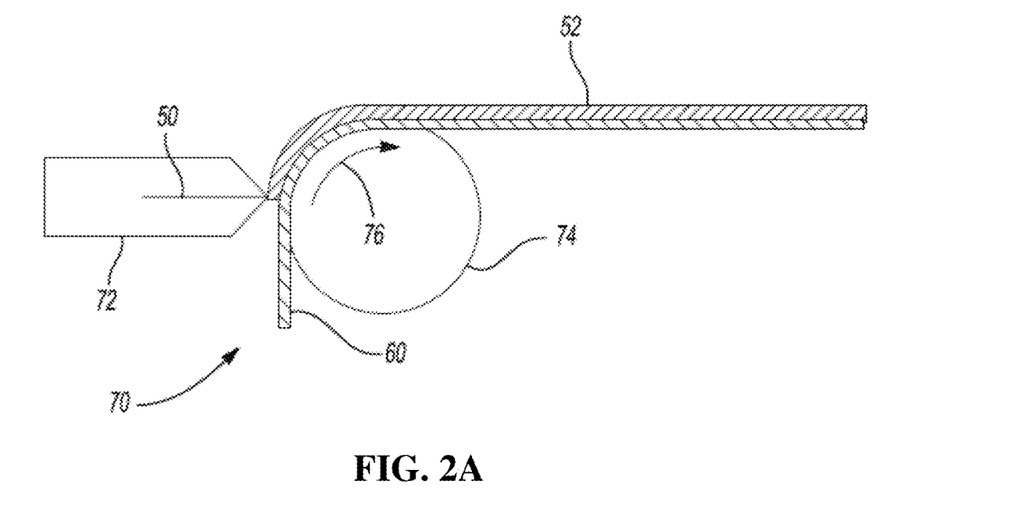
FIG. 2A is a schematic of a die coating process for applying a polymer solution to a substrate according to various aspects of the current technology.

FIG. 2A shows an embodiment where a liquid precursor material 50 is applied to a substrate 60 by die coating with an exemplary die coating device 70 including a slot die 72 containing the polymer solution 50 and a roller 74. Here, the slot die 72 applies the liquid precursor material 50 to the substrate 60 as the roller 74 rolls in the direction of arrow 76. A coating layer 52 forms on the substrate 60 as the substrate moves through the coating device 70.

Figure 2B:
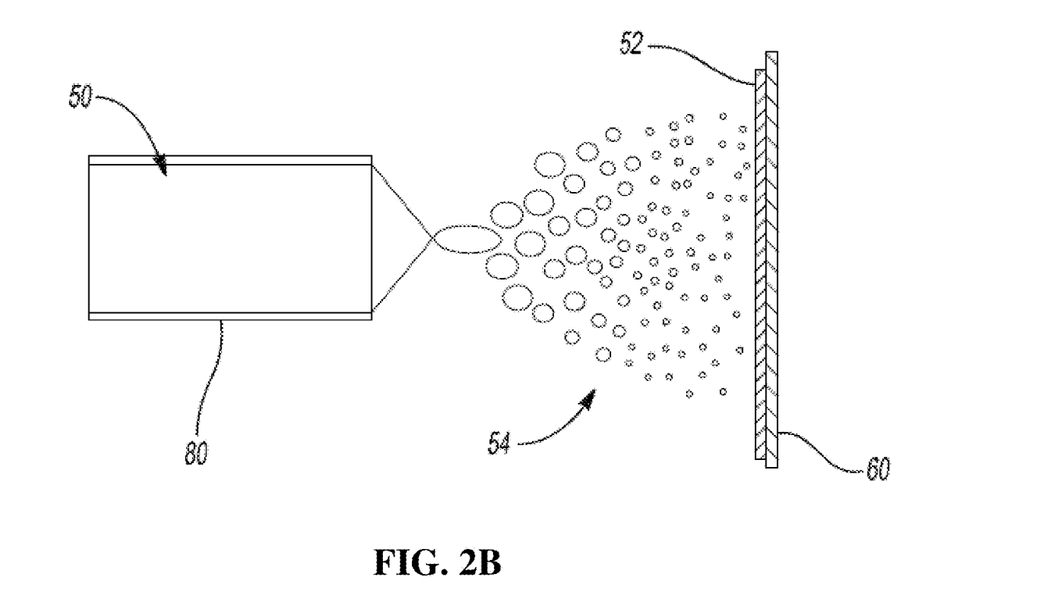
FIG. 2B is a schematic of a spray coating process for applying a polymer solution to a substrate according to various aspects of the current technology.

FIG. 2B shows an embodiment where the same liquid precursor material 50 from FIG. 2A is applied to the same substrate 60 as from FIG. 2A by spray coating with an exemplary spray gun 80 containing the liquid precursor material 50. Here, the spray gun 80 ejects the liquid precursor material 50 as a spray plume 54, which coats the substrate 60 and forms the coating layer 52.

The liquid precursor material applied to the substrate comprises a polymer, a first solvent and optionally a second solvent. The polymer is soluble in an organic solvent that is miscible with water, alcohol, or a water/alcohol mixture to induce pore formation in a phase inversion process. As explained above, in some embodiments less than 100% of the polymer is soluble in the first solvent. Moreover, the polymer has a cohesive energy of greater than about 100,000 J/mol; a melting temperature of greater than or equal to about 300° C. or greater than or equal to about 350° C., a glass transition of greater than or equal to about 200° C. or greater than or equal to about 250° C., and a molecular weight (weight average molecular weight) of greater than about 10,000 g/mol. The polymer may be an aromatic polyamide according to certain aspects of the current technology. The aromatic polyamide may be a homopolymer (derived from a single repeating unit) or a heteropolymer (derived from more than one repeating units), which may be either linear or branched. If a heteropolymer is derived from two repeating unit constituents, the aromatic polyamide may assume any copolymer chain arrangement, including those of a block copolymer or a random copolymer. Similarly, if the aromatic polyamide is a heteropolymer derived from more than two repeating unit constituents, it may likewise be a block copolymer or a random copolymer. In certain aspects, the polymer may be poly(m-phenylene-isophthalamide), poly(p-phenylene-terephthalamide), polyimide, polysulfone, or combinations thereof.

In certain embodiments, the first solvent is organic, aprotic, and miscible with water, alcohol, or water/alcohol mixtures. The solvent may be, as non-limiting examples, N-methyl-2-pyrrolidone (NMP), dimethyl sulfoxide (DMSO), or dimethylformamide (DMF). Additionally, the first solvent may optionally comprise a salt, such as, for example, $CaCl_2$, LiCl, and combinations thereof at a solvent:salt ratio of about 98:2 to about 80:20. As discussed above, the liquid precursor material may include components that are not completely dissolvable in the first solvent. Accordingly, the "first solvent" may also be understood to be a "first carrier."

In various aspects of the present technology, the polymer has a high concentration in the first solvent in order to impart good mechanical properties on the separator. However, if the polymer concentration is too high in the first solvent, its viscosity will become too high, such that the liquid precursor material is difficult to manage and separators with varying properties will be produced. To get a uniform coating of the substrate at a high production rate, the liquid precursor material is flowable and may have a viscosity of less than or equal to about 20,000 cps, or less than or equal to about 2000 cps. Accordingly, the second solvent may be added to reduce the viscosity of the liquid precursor material and at least a portion of the second solvent will be removed from the coating layer prior to the first solvent, for example, by evaporation. Therefore, the second solvent has a higher volatility, i.e., a lower boiling point, than the first solvent. Non-limiting examples of the second solvent include acetonitrile, tetrahydrofuran (THF), ethyl acetate, and combinations thereof. Similar to the first solvent, not all of the components of the liquid precursor material may be completely dissolvable in the second solvent. Accordingly, the "second solvent" may also be understood to be a "second carrier."

The liquid precursor material includes a polymer concentration of from greater than or equal to about 5% to less than or equal to about 40% by weight or from greater than or equal to about 10% to less than or equal to about 25% by weight based on the first solvent. When the second solvent is included in the liquid precursor material, the polymer concentration may be from greater than or equal to about 1.5% to less than or equal to about 30% by weight based on the combined weight of the first and second solvents. Moreover, in various aspects of the present technology, the first and second solvents are present in the liquid precursor material at a first solvent:second solvent ratio of from about 10:0 to about 1:2, or from about 10:1 to about 1:1.

In various aspects of the present technology, the liquid precursor material may include additional components that affect the properties of the resulting separator. For example, the liquid precursor material can include nano-sized particles to improve the ionic conductivity of the separator and/or micron or sub-micron-sized particles to improve the thermal stability and penetration resistance of the separator. The nano-sized and/or micron or sub-micron-sized particles can be particles, spheres, fibers, tubes, and the like. In various embodiments, the nano-sized and/or micron or sub-micron sized particles are ceramics, such as oxides, carbides, nitrides, phosphates, or carbonates of metals and metalloids. The nano-sized particles, or nanoparticles, have a diameter of greater than or equal to about 2 nm to less than or equal to about 500 nm and the micro or sub-micron-sized particles have a diameter of from greater than or equal to about 0.1 μm to less than or equal to about 10 μm. Non-limiting examples of ceramic oxides include $SiO_2$, $Al_2O_3$, $B_2O_3$, CaO, $K_2O$, $Na_2O$, MgO, $Fe_2O_3$, FeO, $Fe_3O_4$, ZnO, $TiO_2$, $ZrO_2$, BaO, $Li_2O$, PbO, SrO, and combinations thereof, non-limiting examples of ceramic carbides include SiC, $CaC_2$, $Mo_2C$, $B_4C$, $Al_4C_3$, WC, ZrC, VC, TiC, and combinations thereof, non-limiting examples of ceramic nitrides include AlN, BN, $Ba_3N_2$, $Si_3N_4$, $Ti_2CN$, Ca3N2, GaN, $Ge_3N_4$, InN, $Li_3N$, $Mg_3N_2$, $Sr_3N_2$, TiN, ZrN, and combinations thereof, non-limiting examples of ceramic phosphates include $Ca_2P_2O_7 \cdot xH_2O$, $Ca_3(PO_4)_2$, $KH_2PO_4$, $NaH_2PO_4$, ZrP, Fe(H2PO4)2, FeH(HPO4)2, FePO4, and combinations thereof, and non-limiting examples of ceramic carbonates include $BaCO_3$, $CoCO_3$, CaCO3, $CuCO_3$, $Li_2CO_3$, $Na_2CO_3$, $MgCO_3$, $SrCO_3$, $NiCO_3$, $K_2CO_3$, and combinations thereof. The nano-sized particles can be included in the liquid precursor material at a concentration of from greater than 0% to less than or equal to about 100% based on the weight of the polymer, such as, for example, at a concentration of about 20% based on the weight of the polymer. The micron or sub-micron-sized particles can be included at a concentration of from greater than or equal to about 0% (including greater than or equal to a positive amount above 0%) to less than or equal to about 900% based on the weight of the polymer, such as, for example, at a concentration of about 300% based on the weight of the polymer.

Additionally, the liquid precursor material may include a non-solvent to aid in a phase inversion process. In various embodiments, the non-solvent is water, acetone, alcohol (such as at least one of methanol, ethanol, isopropanol, butanol, etc.), or a combination thereof. The non-solvent may be added alone to the liquid precursor material or it can be added as a mixture of non-solvent with first solvent, e.g., as a mixture of NMP and water. The non-solvent is added at a final non-solvent:first solvent ratio of from about 2:98 to about 30:70. As a non-limiting example, water can be added to the liquid precursor material as a non-solvent with a final water:first solvent ratio of from about 2:98 to about 30:70. Alternatively, as a non-limiting example, a water-first solvent mixture can be added to the liquid precursor material to result in a final water:first solvent ratio of from about 2:98 to about 30:70. The non-solvent diffuses into the liquid precursor material and helps optimize a porous structure geometry of the coating layer.

In various embodiments, the substrate is a temporary solid film that will be removed as part of the fabrication process. The solid film may have a flat surface that is wettable by the liquid precursor material. Non-limiting examples of suitable solid films include metal foil and polyethylene terephthalate (PET) films. Here, the liquid precursor material is applied to only one side of the solid film.

In other embodiments, the substrate is a porous mechanical reinforcement, i.e., a porous structure that becomes part of the separator. In such embodiments, the liquid precursor material is applied to the porous mechanical reinforcement to generate a coating or laminate. Also, a portion of the liquid precursor material may infuse into the porous mechanical reinforcement. As used herein, a "laminate" refers to a porous coating or layer that is in continuous or discontinuous contact with a porous mechanical reinforcement, wherein a portion of the laminate may be infused in the porous mechanical reinforcement. Therefore, the liquid precursor material can be added to one side of the porous mechanical reinforcement or to two opposing sides of the porous mechanical reinforcement. For example, liquid precursor material can be applied to two opposing sides of the porous mechanical reinforcement by spray coating. Non-limiting examples of suitable porous mechanical reinforcements include woven fiber mats, non-woven fiber mats, and polyolefins, such as commercially available polyolefin separators and polyolefin porous membranes.

After or during the applying a liquid precursor material to a substrate, and when the liquid precursor material includes the optional second solvent, the method includes removing a portion of the second solvent, such as, for example, by volatilizing or evaporating a portion of the second solvent. Evaporating the second solvent can be performed at greater than or equal to about ambient temperature to less than or equal to about 100° C. The temperature and time of evaporation are sufficient to reduce the concentration of the second solvent in the liquid precursor material applied to the substrate by from greater than or equal to about 50% by weight to less than or equal to about 100% by weight. In various aspects of the present technology, the concentration of the second solvent is reduced by more than about 50% by weight, more than about 60% by weight, more than about 70% by weight, more than about 80% by weight, or more than about 90% by weight. When the liquid precursor material is applied by die coating (see FIG. 2A), evaporating takes place in an environment having a desired temperature, such as in an oven. When the liquid precursor material is applied by spray coating (see FIG. 2B), evaporating takes place, at least in part, in midair while the liquid precursor material is being ejected from the spray gun 80 as a spray plume 54. Evaporation may further occur after the liquid precursor material is applied to the substrate, at ambient temperature or at a temperature above ambient temperature in an oven.

The method also includes precipitating the polymer from the liquid precursor material in the coating layer through a phase inversion process to form a polymer membrane. In one embodiment, the polymer is precipitated by conditioning the coating layer in a controlled environment, such as, for example, an environmental chamber, having a humidity of greater than or equal to about 50% to less than or equal to about 100%, or greater than or equal to about 75% to less than or equal to about 100%, such as a humidity of about 90%, and a temperature of greater than or equal to about 20° C. to less than or equal to about 50° C., or greater than or equal to about 25° C. to less than or equal to about 40° C. Here, water from the humidity enters the coating layer to initiate a phase inversion process, and causes the polymer to precipitate from the first solvent. When the optional second solvent is included in the liquid precursor material, the conditioning is performed after the evaporating the second solvent.

Alternatively, precipitation of the polymer from the liquid precursor material in the coating layer can be induced by adding a non-solvent, such as water, to the liquid precursor material prior to the applying a liquid precursor material to a substrate. In this embodiment, the liquid precursor material preferably includes the second solvent. The non-solvent may be added at a low concentration, such that precipitation does not immediately occur. In this embodiment, when the second solvent is evaporated from the coating layer, the non-solvent concentration increases. When the concentration of the non-solvent is sufficiently high, phase inversion occurs whereby the polymer precipitates out of the liquid precursor material to form a polymer membrane. Therefore, when a non-solvent is added to the liquid precursor material, phase inversion is induced by removing at least part of the second solvent, which increases the concentration of the non-solvent in the liquid precursor material. This increased concentration of the non-solvent causes the polymer to precipitate onto the substrate. In addition to, or alternatively to, adding water to the liquid precursor material, when the liquid precursor material is being applied to the substrate by spray coating, non-solvent can be absorbed into the liquid precursor material in midair as well as when it is deposited on the substrate.

After precipitating the polymer from the liquid precursor material in the coating layer to form a polymer membrane, the method optionally includes washing the polymer membrane. Washing the polymer membrane comprises rinsing the polymer membrane with water or submerging the polymer membrane and substrate in a water bath to remove the first solvent and, when the liquid precursor material includes the optional second solvent, any remaining second solvent, such as residual second solvent, in the polymer membrane.

Then, the method includes drying the polymer membrane or polymer laminate, wherein the polymer membrane is the battery separator or the substrate comprising the polymer laminate is the battery separator. Drying comprises exposing the polymer membrane to heat and air to remove water that remains associated with the polymer membrane. Drying can be performed at greater than or equal to about ambient temperature to less than or equal to about 150° C., such as at a temperature of about 30° C., about 35° C., about 40° C., about 45° C., about 50° C., about 55° C., about 60° C., about 65° C., about 70° C., about 80° C., about 90° C., about 100° C., about 110° C., about 120° C., about 130° C., about 140° C., or about 150° C. with air. In embodiments where the substrate is a temporary solid film, the solid film is separated, i.e., removed, from the polymer membrane during or after the washing or before, during, or after the drying. Optionally, after or during the rinsing, the method may include stretching the polymer membrane, i.e., separator, to increase pore size for improved ionic conductivity and to improve the mechanical properties of the separator. The separator can be stretched laterally and/or longitudinally by an amount of greater than or equal to about 0.5%.

The method may also optionally include, after the stretching or rinsing, annealing the polymer membrane, i.e., separator, to increase separator crystallinity, which in turn improves electrolyte resistance. Annealing is started in a wet state and preferably while there is a trace amount of the first solvent in the coating layer. For example, there should be greater than or equal to about 10 parts water per 100 parts of solids. Also, annealing is performed at a temperature of greater than or equal to about 75° C. or greater than or equal to about 100° C. for a time of greater than or equal to about 1 second. In various embodiments, annealing is performed at a temperature of greater than or equal to about 75° C. to less than or equal to about 150° C. for a time of greater than or equal to about 1 second to less than or equal to about 24 hours. In some embodiments, annealing is performed at a temperature of about 120° C. for a time of about 2 hours. Drying can be performed after annealing as described above or the drying can be performed by the annealing.

The battery separator or battery separator laminate, i.e., coated onto a permanent porous structure, has a dry thickness of from about 5 μm to about 100 μm, or from about 10 μm to about 50 μm and a uniform distribution of pores. Accordingly, the battery separator or battery separator laminate has a porosity of greater than or equal to about 20% to less than or equal to about 80%, or greater than or equal to about 40% to less than or equal to about 70%. The pores have an average size of less than about 10 μm, with and without the optional stretching. Moreover, the battery separator or battery separator laminate has an ionic conductivity that is dependent on the electrolyte, a tensile strength of greater than or equal to about 10 MPa, and a shrinkage after being exposed to a temperature of about 120° C. for a time of about 1 hour of less than or equal to about 5%, of less than or equal to about 3% or less than or equal to about 1%, including a shrinkage of about 0%. The separators made according to the current technology are suitable for use in batteries, such as, for example, lithium ion batteries.

Embodiments of the present technology are further illustrated through the following non-limiting examples.

EXAMPLE 1

Polymer solution components: (a) poly(m-phenylene-isophthalamide); (b) solvent: NMP with $CaCl_2$/LiCl; (c) a volatile second solvent: acetonitrile or THF; (d) ceramic particles (nano silica to improve the ionic conductivity; sub-micron/micron alumina to improve the thermal performance).

The polymer solution is applied to a PET thin film substrate. Then, the volatile second solvent is evaporated to increase the polymer concentration. For spray coating, the volatile solvent is evaporated in midair. For die coating, the evaporation takes place in an oven. The polymer solution coating layer is conditioned in a controlled environment (humidity and temperature). The coating layer is then rinsed to remove the solvent in the polymer coating layer. The PET thin film substrate is separated from the coating layer.

Comparative Example 1 is prepared in the same manner, but without the volatile second solvent. Rather, NMP is added to reduce the viscosity of the polymer solution.

Comparative Example 2 is prepared like Comparative example 1, but no additional solvent is added to reduce viscosity.

TABLE 1

Characteristics of Example 1 and the Comparative Examples.

| Polymer Solution | Example 1 | Comparative Example 1 | Comparative Example 2 |
|---|---|---|---|
| Viscosity | 250 cp | 275 cp | >10,000 cp (coating is difficult) |
| Membrane Strength | 11.5 MPa | <5 MPa | 14.2 MPa |

EXAMPLE 2

Polymer solution components: (a) poly(m-phenylene-isophthalamide); (b) solvent: NMP with $CaCl_2$/LiCl; (c) a volatile second solvent: acetonitrile or THF. (d) ceramic particles (nano silica to improve the ionic conductivity; sub-micron/micron alumina to improve the thermal performance).

The polymer solution is applied to a PET thin film substrate. Then, the volatile second solvent is evaporated to increase the polymer concentration. The polymer solution coating layer is conditioned in a controlled environment (humidity and temperature). The coating layer is then rinsed to remove the solvent in the polymer coating layer and the substrate is removed. Next, the coating layer is stretched greater than or equal to about 0.5% to increase pore size (for improved ionic conductivity) and to improve membrane mechanical properties. The membrane is then annealed in a wet state (containing greater than 10 parts of water per 100 parts of solids) at a temperature of greater than or equal to about 100° C. for a time of greater than or equal to about 1 second to increase film crystallinity. A crystalline phase improves electrolyte resistance. Table 2 compares the membrane strength of Example 2 to Example 1.

TABLE 2

Comparison of membrane strength between Example 1 and Example 2.

| Polymer Solution | Example 1 | Example 2 |
|---|---|---|
| Membrane Strength | 11.5 MPa | 15.1 MPa (due to the increased crystallinity) |

EXAMPLE 3

Polymer solution components: (a) poly(m-phenylene-isophthalamide); (b) solvent: NMP with CaCl2/LiCl; (c) a volatile second solvent: acetonitrile or THF; (d) ceramic particles (nano silica to improve the ionic conductivity; sub-micron/micron alumina to improve the thermal performance).

Figure 3:
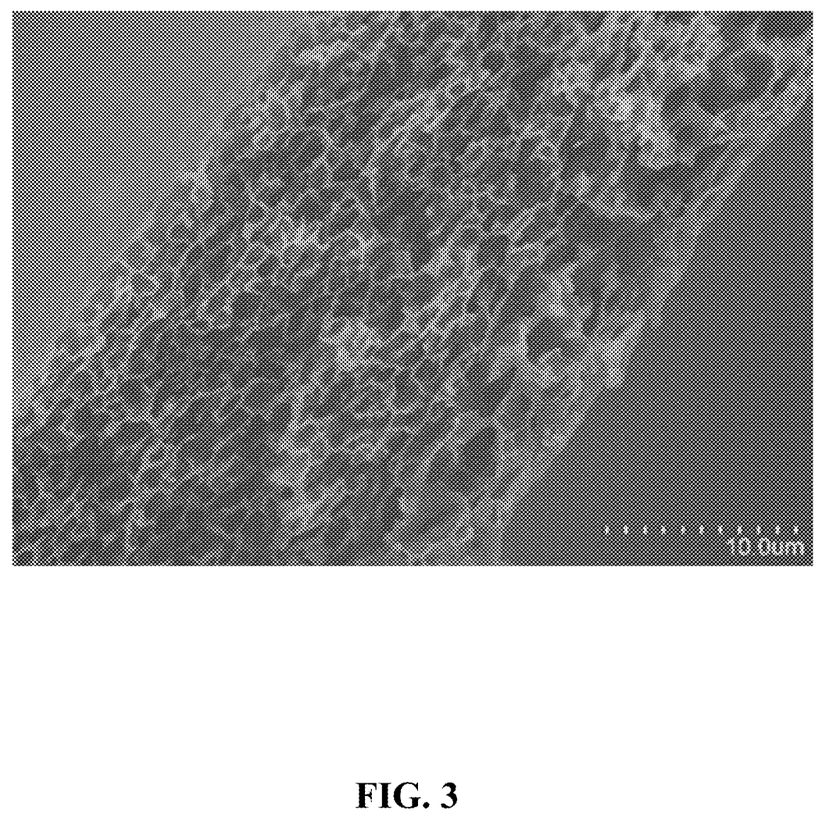
FIG. 3 is a micrograph showing a cross section of a battery separator made according to certain aspects of the current technology.

A membrane/separator is prepared similarly to Example 1, but with the addition of a non-solvent. In particular, a mixture of the water/NMP (non-solvent) is added to the polymer solution and the polymer solution is applied to a PET thin film substrate to generate a polymer solution coating layer. The polymer solution coating layer is heated to evaporate the volatile second solvent, increase the water concentration, and precipitate the polymer. The coating layer, i.e., polymer, is then rinsed to remove the solvent in the polymer coating layer. The PET thin film substrate is separated from the coating layer. Table 3 shows various characteristics of Example 1, Example 3, and of a commercial PE separator. To determine ionic conductivity ($\sigma_{eff}$), samples are saturated with a liquid electrolyte (1M LiPF$_6$ in EC/DMC; 1:1 by volume). FIG. 3 is a micrograph that shows a cross section of the Example 3 membrane/separator.

TABLE 3

Characteristics of Example 1, Example 3, and of a commercial separator.

| | Commercial PE separator | Example 1 | Example 3 |
|---|---|---|---|
| $\sigma_{\mathit{eff}}$ (mS/cm) | 1.47 | 1.58 | 1.69 |
| Shrinkage at 120° C. for 1 hour | 9% | about 0% | about 0% |

EXAMPLE 4

Polymer solution components: (a) poly(m-phenylene-isophthalamide); (b) solvent: NMP with CaCl$_2$/LiCl; (c) a volatile second solvent: acetonitrile or THF. (d) ceramic particles (nano silica to improve the ionic conductivity; sub-micron/micron alumina to improve the thermal performance).

Figure 4:
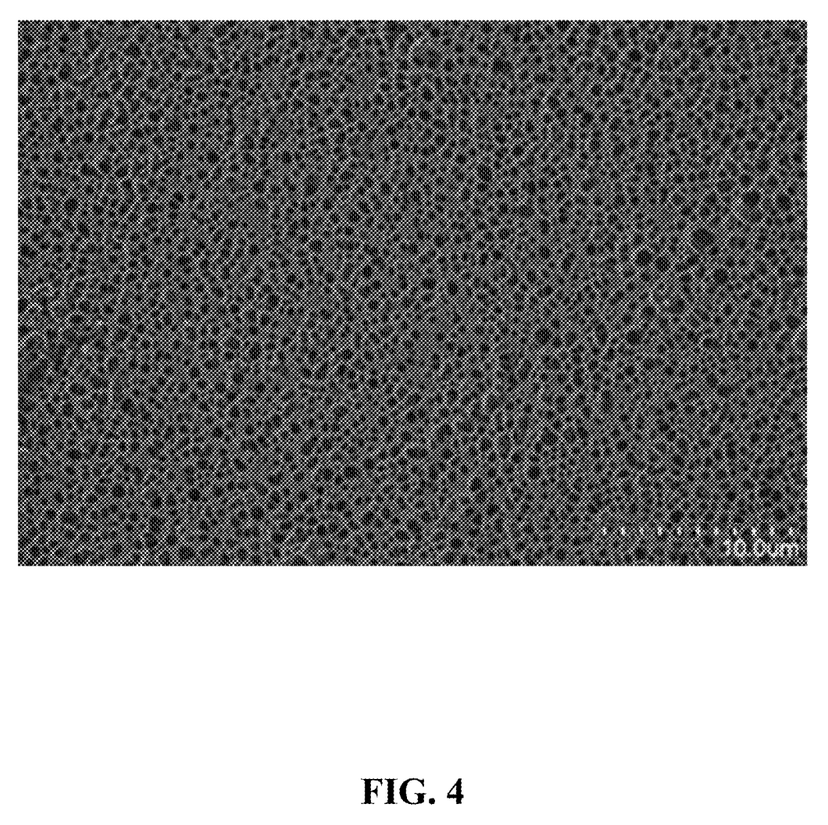
FIG. 4 is a micrograph showing a surface of a battery separator made according to certain aspects of the current technology.

The polymer solution is applied to a non-woven reinforcement to generate a coating layer. The reinforcement helps improve the mechanical property of the laminated separator. Then, the volatile solvent is evaporated to increase the polymer concentration. The coating layer is conditioned in a controlled environment (humidity and temperature) and then rinsed to remove the solvent in the polymer coating layer. The coating layer, e.g., membrane, is then annealed in a wet state (containing greater than 10 parts of water per 100 parts of solids) at a temperature of greater than or equal to about 100° C. for a time of greater than or equal to about 1 second to increase film crystallinity. Table 4 shows the ionic conductivity and shrinkage properties of Example 4 and a commercial separator. Table 5 compares the membrane strength of a membrane/separator made similarly to Example 4, but without the non-woven reinforcement, i.e., Example 2, to Example 4. FIG. 4 is a micrograph showing the surface of the membrane/separator of Example 4.

TABLE 4

Characteristics of Example 4 and of a commercial separator.

| | Commercial PE separator | Example 4 |
|---|---|---|
| $\sigma_{\mathit{eff}}$ (mS/cm) | 1.47 | 1.61 |
| Shrinkage at 120° C. for 1 hour | 9% | about 0% |

TABLE 5

Comparison of membrane strength between Example 2 and Example 4.

| | Example 2 | Example 4 |
|---|---|---|
| Tensile Strength (MPa) | 13.1 | 22.3 |

EXAMPLE 5

Polymer solution components: (a) poly(m-phenylene-isophthalamide); (b) solvent: NMP with CaCl$_2$/LiCl; (c) a volatile second solvent: acetonitrile or THF. (d) ceramic particles (nano silica to improve the ionic conductivity; sub-micron/micron alumina to improve the thermal performance).

A membrane/separator is prepared similarly to Example 4, but with the addition of a non-solvent and without the annealing. In particular, a mixture of the water/NMP (non-solvent) is added to the polymer solution. The polymer solution is then applied to a non-woven reinforcement to generate a coating layer. The reinforcement helps improve the mechanical property of the laminated separator. Then, the volatile solvent (THF) is evaporated to precipitate the polymer to increase the water concentration and induce precipitate of the polymer to form a polymer layer. The polymer layer, i.e., laminate, is then rinsed to remove the solvent in the polymer layer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of producing a battery separator, the method comprising:
    applying a liquid precursor material to a substrate to generate a coating layer on the substrate, wherein the liquid precursor material comprises:
        a polymer having a cohesive energy of greater than or equal to about 100,000 J/mol, a melting temperature of greater than or equal to about 300° C., a glass transition of greater than or equal to about 200° C., and a molecular weight of greater than or equal to about 10,000 g/mol; and
        a first solvent;
    precipitating the polymer from the liquid precursor material in the coating layer to form a polymer membrane; and
    drying the polymer membrane to generate the battery separator.

2. The method according to claim 1, wherein the polymer is poly(m-phenyl ene-isophthalamide), poly(p-phenylene-terephthalamide), polyimide, polysulfone, or a combination thereof.

3. The method according to claim 1, wherein the first solvent is N-methyl-2-pyrrolidone (NMP), dimethyl sulfoxide (DMSO), or dimethylformamide (DMF) and optionally contains CaCl$_2$, LiCl, or both CaCl$_2$ and LiCl.

4. The method according to claim 1, wherein the liquid precursor material further comprises a second solvent selected from the group consisting of acetonitrile, tetrahydrofuran (THF), ethyl acetate, and combinations thereof, and the method further comprises, after the applying and before the precipitating, evaporating the second solvent.

5. The method according to claim 4, wherein the liquid precursor material further comprises a non-solvent comprising water, acetone, alcohol, or a combination thereof, and wherein the precipitating the polymer from the liquid precursor material in the coating layer is performed by the evaporating the second solvent.

6. The method according to claim 1, wherein the polymer has a concentration of greater than or equal to about 5% to less than or equal to about 40% by weight based on the first solvent.

7. The method according to claim 1, wherein the substrate is a solid film substrate and the method further comprises:
separating the solid film substrate from the polymer membrane during or after the precipitating the polymer from the liquid precursor material.

8. The method according to claim 1, wherein the substrate is a woven fiber mat, a non-woven fiber mat, polyolefin separator or a polyolefin porous membrane, and the applying a liquid precursor material to the substrate comprises applying a liquid precursor material to one side or two opposing sides of the substrate.

9. The method according to claim 1, wherein the battery separator has a uniform distribution of pores, the pores having an average diameter of less than or equal to about 10 μm, and wherein the battery separator has a porosity of from greater than or equal to about 20% to less than or equal to about 80%.

10. The method according to claim 1, wherein the applying a liquid precursor material to a substrate to generate a coating layer on the substrate is performed by die coating or spray coating.

11. The method according to claim 1, wherein the precipitating a polymer from the liquid precursor material in the coating layer is performed by conditioning the coating layer in a controlled environment having a humidity of greater than or equal to about 50% to less than or equal to about 100% and a temperature of greater than or equal to about 20° C. to less than or equal to about 50° C.

12. A method of producing a battery separator, the method comprising:
applying a liquid precursor material to a solid film substrate to generate a coating layer on the solid film substrate, wherein the liquid precursor material comprises:
a polymer having a cohesive energy of greater than or equal to about 100,000 J/mol; a melting temperature of greater than or equal to about 300° C., a glass transition of greater than or equal to about 200° C., and a molecular weight of greater than or equal to about 10,000 g/mol;
a first solvent; and
a second solvent having a higher volatility than the first solvent;
evaporating a portion of the second solvent;
precipitating the polymer from the liquid precursor material in the coating layer to form a polymer membrane;
rinsing the polymer membrane to remove the first solvent and any residual second solvent; and
removing the solid film substrate from the polymer membrane, wherein the polymer membrane is the battery separator.

13. The method according to claim 12, wherein the liquid precursor material further comprises ceramic particles, wherein the ceramic particles are nano-sized silica particles, micron-sized alumina particles, sub-micron-sized alumina particles or a combination thereof.

14. The method according to claim 12, wherein the film substrate is a metal foil or a polyethylene terephthalate (PET) thin film.

15. The method according to claim 12, wherein the battery separator has a shrinkage after being exposed to about 120° C. for 1 hour of less than or equal to about 5%.

16. A method of producing a battery separator, the method comprising:
applying a liquid precursor material to at least one side of a substrate to generate at least one coating layer on the substrate, wherein the substrate is a porous mechanical reinforcement selected from the group consisting of a woven fiber mat, a non-woven fiber mat, a polyolefin separator, and a polyolefin porous membrane, and the liquid precursor material comprises:
a polymer having a cohesive energy of greater than about 100,000 J/mol; a melting temperature of greater than about 300° C., a glass transition of about 200° C., and a molecular weight of greater than about 10,000 g/mol;
a first solvent; and
a second solvent having a higher volatility than the first solvent;
evaporating a portion of the second solvent;
precipitating the polymer from the liquid precursor material in the at least one coating layer to form at least one polymer laminate layer; and
rinsing the at least one polymer laminate layer to remove the first solvent and any residual second solvent and to thereby form the battery separator comprising the substrate and the at least one polymer laminate layer.

17. The method according to claim 16, wherein the first solvent is N-methyl-2-pyrrolidone (NMP), dimethyl sulfoxide (DMSO), or dimethylformamide (DMF) and the liquid precursor material further comprises:
a non-solvent selected from the group consisting of water, acetone, alcohol, and combinations thereof, and
wherein the precipitating is performed during the evaporating the second solvent.

18. The method according to claim 16, wherein the battery separator has a tensile strength of greater than or equal to about 15 MPa.

* * * * *